(12) United States Patent
Doone et al.

(10) Patent No.: US 6,396,676 B1
(45) Date of Patent: May 28, 2002

(54) ELECTRICAL SURGE ARRESTERS

(75) Inventors: Rodney Meredith Doone; Patrick George Short, both of West Sussex (GB)

(73) Assignee: Bowthrope Industries Limited, Crawley (GB)

( * ) Notice: Subject to any disclaimer, the term of this patent is extended or adjusted under 35 U.S.C. 154(b) by 0 days.

(21) Appl. No.: 09/367,828
(22) PCT Filed: Feb. 25, 1998
(86) PCT No.: PCT/GB98/00598
§ 371 (c)(1),
(2), (4) Date: Nov. 3, 1999
(87) PCT Pub. No.: WO98/38653
PCT Pub. Date: Sep. 3, 1998

(30) Foreign Application Priority Data

Feb. 25, 1997  (GB) ............................................. 9703861
Nov. 14, 1997  (GB) ............................................. 9724126

(51) Int. Cl.$^7$ ................................................. H02H 9/00
(52) U.S. Cl. ........................ 361/117; 361/118; 361/127
(58) Field of Search ................................ 361/118, 117, 361/119, 127, 120, 58

(56) References Cited

U.S. PATENT DOCUMENTS 4,825,188 A    4/1989   Parraud et al. ................ 338/21

FOREIGN PATENT DOCUMENTS

| EP | 0 545 038 A | 6/1993 | ............ H01C/7/12 |
| EP | 0 726 581 A | 8/1996 | ............ H01B/19/04 |
| WO | WO 95 10846 A | 4/1995 | ............ H01C/7/112 |

*Primary Examiner*—Stephen W. Jackson
(74) *Attorney, Agent, or Firm*—Connolly Bove Lodge & Hutz LLP

(57) ABSTRACT

An electrical surge arrester is manufactured by securing a stack of metal oxide varistor blocks between end terminations by passing a rod through through-holes in the varistor blocks and securing the ends of the rod to the end terminations. The through-holes are larger than the rod cross-section and a silicone rubber material is injected into the void which otherwise would exist between the rod and the interior surfaces of the through-holes in the varistor blocks. The silicone rubber material is also moulded around the exterior of the stacked varistor blocks and forms a shedded external housing for the arrester. The silicone rubber coatings on the varistor block internal and external surfaces effects a passivation function and means that the passivation coatings normally provided on the surfaces of varistor blocks by their manufacturers at significant cost can be omitted.

15 Claims, 5 Drawing Sheets

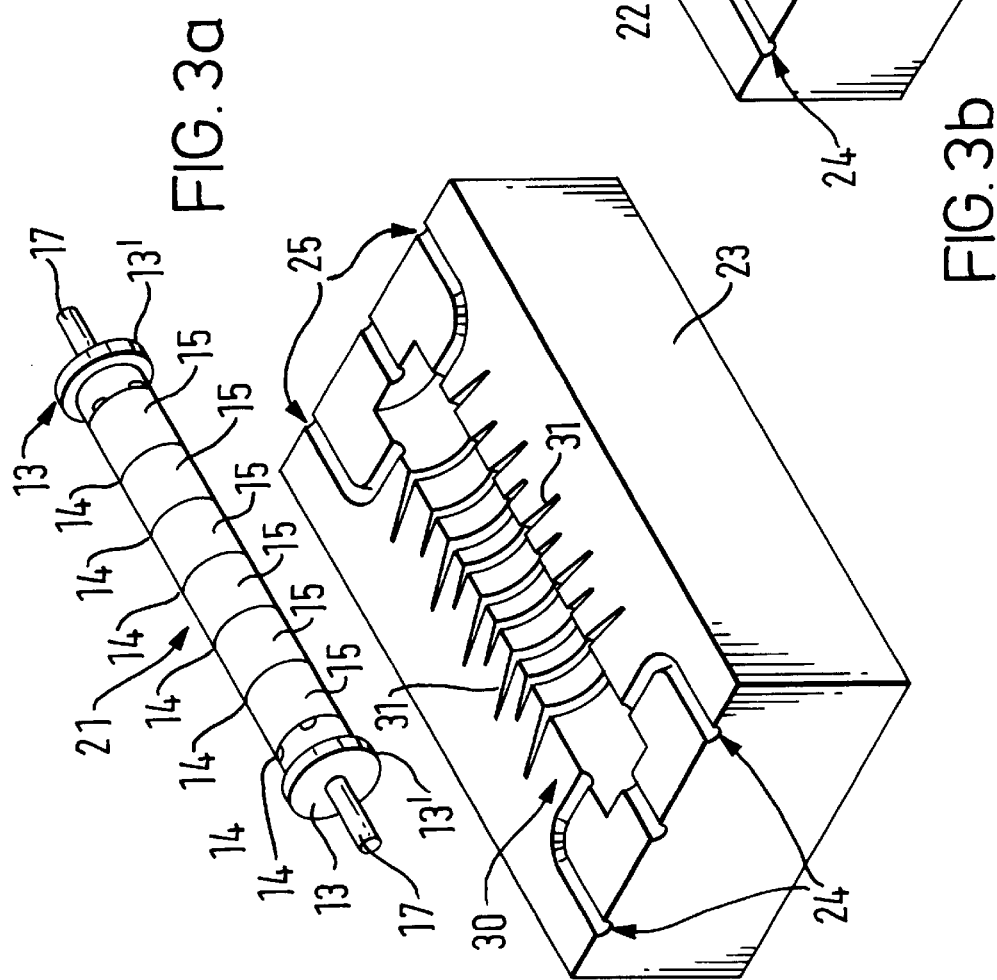

ELECTRICAL SURGE ARRESTERS

FIELD OF THE INVENTION

This invention concerns improvements relating to electrical surge arresters, also known as surge diverters, which, as is well known, are used in high voltage electric installations for providing a path to ground for surge overvoltages occasioned for example by lightning strikes and as switching transients.

BACKGROUND OF THE INVENTION

In GB-A-2188199 there is described a surge arrester which is primarily intended for use in distribution class applications, but can be coupled with other electrically matched arresters in a series parallel arrangement for higher voltage station class applications as described in GB-A-2230661. This surge arrester comprises a rigid core of great physical strength upon which there is provided a shedded outer housing of polymeric material, the core consisting of a plurality of ceramic varistor blocks stacked end to end and encased within a shield of reinforced rigid plastics material. The reinforced rigid plastics material shield is preferably bonded directly to the external surface of the varistor block stack, though proposals have been made to provide a thin spacing layer of Mylar™ between the varistor blocks and the shield. There may be a number of metal (eg aluminium) spacer blocks incorporated into the varistor block stack for the purpose of providing the stack with an overall length sufficient to avoid flashover externally of the arrester and terminal blocks are provided at opposite ends of the stack for enabling the coupling of the arrester to associated equipment.

As described in GB-A-2188199 the rigid core and polymeric housing of the surge arrester provides significant advantages as compared to porcelain housed surge arresters which have long suffered a fragility problem. Conventional porcelain housed surge arresters commonly have an inert gas filling which can literally blow the arrester housing apart if the arrester is subjected to an excessive overvoltage, littering the surrounding area with hot fragments and causing fires. Pressure relief rupturable diaphragms can be provided in the end cap arrangements of gas filled porcelain housed surge arresters, but these provisions complicate the arrester construction and the fragility problem of the porcelain housing still remains.

The rigid cored, polymer housed, gapless surge arrester of GB-A-2188199 is manufactured to avoid gaseous inclusions and retains its structural integrity even under failure. Additionally, it enables support insulators to be dispensed with, since the rigid core of the arrester is sufficiently strong to support the loading which conventionally is supported by the provision of support insulators. The inherent strength of the arrester of GB-A-2188199, which results from its rigid core and gapless construction, enables it to be coupled into a series parallel array capable of handling station class voltages as described in GB-A-2230661. As a result of these and other advantages, the surge arrester of GB-A-2188199 has enjoyed considerable commercial success.

Notwithstanding the success of the surge arresters of GB-A-2188199 and GB-A-2230661 we have, as a part of our continuous improvement strategy, considered how component costs, assembly times and manufacturing process times might be reduced. The manufacture of surge arresters in accordance with GB-A2188199 requires curing processes to cure the reinforced epoxy material that is applied to the varistor block stack in an uncured state and, if a silver loaded adhesive is provided between the contiguous faces of the stacked blocks to improve electrical contact therebetween, additionally requires a curing process for the adhesive. After curing, the core assembly is then sleeved with its polymeric housing in a separate operation and finally end caps are fitted. The manufacturing time required for these processes is considerable and demands the availability of curing ovens, and a manufacturing technique which could eliminate the curing process would show considerable benefit in manufacturing space and time. Any reduction in component costs would be an added bonus.

OBJECTS AND SUMMARY OF THE INVENTION

It is, accordingly, the object of the present invention to provide an electrical surge arrester which can be more readily manufactured than the surge arrester of GB-A-2188199 without prejudice to the advantages demonstrated by that surge arrester.

The present invention stems primarily from the realization that the external passivation coating that is invariably provided by manufacturers of metal oxide varistor blocks on all surfaces of the blocks other than their metallized contact surfaces can in fact be dispensed with, thereby leading to a reduction in component costs. Varistor blocks conventionally are solid circularly cylindrical in shape with metallized contact coatings on their circular axially end faces and passivation coatings on their cylindrical external surfaces, the passivation coating comprising an epoxy resin or glass or a separately fitted electrically insulating collar. The passivation coating enables a varistor to be used to its full electrical capability by avoiding external flashover problems between the contact surfaces, and its provision is also useful to the manufacturer in that it enables classification and quality control operations to be conducted. However, the provision of the passivation coating significantly contributes to the manufacturing cost of varistor blocks.

If the need for a passivation coating can be dispensed with, then the limitations that the need for a passivation coating have imposed upon the shapes of varistor blocks can also be dispensed with. The process by which passivation coatings are most economically provided on varistor blocks is to spray an epoxy resin or glass material on to the surface of the varistor block and then to bake the varistor in an oven until the resin is cured on to the varistor surface or until the glass material has sintered on to the varistor body. This process has hindered the production hitherto of varistor blocks with through holes, since the manufacture of a varistor block with a through hole and with an effective passivation coating on the surface of the through hole would impose additional difficulties for the varistor block manufacturer.

By dispensing with the passivation coating, varistor blocks with through holes, for example an axial through hole, can be manufactured at reasonable cost. A stack of such varistor blocks can then be retained in face-to-face contact between end terminations by means of an electrically-insulating rod appropriately secured to the end terminations and the present invention proposes to take advantage of such an arrangement. A surge arrester comprising varistor blocks with axial through holes which are retained in a stacked configuration and supported by an electrically insulating rod has previously been proposed in GB-A-2073965 but has not been manufactured. Other surge arresters wherein varistor blocks have a supportive rod extending through holes in the blocks are proposed in U.S. Pat. No. 4,262,318, EP-A-

0141239, U.S. Pat. No. 4,825,188 and WO-A-95/10846. The surge arresters of U.S. Pat. No. 4,262,318 and EP-A-0 141 239 are of the previously mentioned porcelain housed type wherein the physical strength of the arrester, such as it is, is provided by the porcelain housing. The surge arrester of U.S. Pat. No. 4,825,188 has a similar construction to a surge arrester embodying to the present invention as hereinafter described, but U.S. Pat. No. 4,825,188 does not disclose or suggest the present invention. Likewise WO-A-95/10846 discloses a similar surge arrester but does not disclose or suggest the present invention.

In accordance with the present invention, a stack of non-passivated varistor elements is retained in face-to-face contact between end terminations by means of an electrically insulating rod passed through through-holes in the varistor elements and secured to the end terminations, the through-holes and the rod are sized such that there is a clearance between the surface of the rod and the surrounding surface of the through-holes, and a silicone rubber material fills the void that otherwise would exist between the rod and the varistor blocks and extends around the external surfaces of the varistor blocks, the silicone rubber material serving as a passivation coating for the varistor blocks.

The silicone rubber material can be injected in liquid form and will cure into a solid without external intervention. The external configuration of the silicone rubber on the outside of the arrester can advantageously include integral sheds to increase the external tracking distance of the arrester between the end terminations and to serve a weather shedding function. Alternatively the silicone rubber on the outside of the arrester could have a circular cylindrical surface and a separate shedded outer housing, formed for example of heat shrink polymeric material or of a mechanically released elastomeric material or of an in situ moulded plastics material, could be provided on the arrester, though this is not preferred in view of the additional manufacturing steps that would be required.

The invention also extends to a method of manufacturing a surge arrester comprising securing a plurality of non-passivated varistor blocks between end terminations by passing an electrically insulating rod through aligned through-holes in the varistor blocks and securing the rod to the end terminations, the through-holes in the varistor blocks being larger than the rod cross-section, injecting a liquid silicone rubber material into the void between the rod and the surfaces of the through-holes in the varistor blocks and around the external surfaces of the stacked varistor blocks, the liquid silicone material being selected to serve a surface passivation function on the varistor blocks, and permitting the silicone rubber material to solidify.

The through-holes in the varistor blocks are preferably axial, since this permits the rod to locate centrally with respect to the stacked varistor blocks and enables a screw-threaded connection of the ends of the rod to the terminations to be utilized. It is however not inconceivable that a crimp type or lock screw type of attachment of the terminations to the through rod might be utilized. The rod is preferably axial, but could be off axis, and also there might be more than one such rod. For simplicity, however, a central, axial rod making screw-threaded or crimped attachment to the arrester terminations is preferred.

By virtue of the use of non-passivated varistor blocks a reduction is achieved in the arrester component costs. By use of appropriate assembly jigs, the varistor blocks can readily be threaded onto their central rod and secured between end terminations screw-threaded and/or compressed onto the ends of the rod. The sub-assembly thus formed can then be placed in an appropriate mould for the injection of the silicone rubber material and a finished surge arrester comes out of the mould. Production costs can thereby be lowered as compared to production costs for the surge arrester described in GB-A-2188199.

The support rod can advantageously be tensioned in the arrester construction, for example by appropriate adjustment of screw-threaded end terminations and/or by inclusion of a pre-load means (one or more Belleville washers, for example) in the varistor stack between the end terminals. This pre-loading assists the surge arrester in withstanding operational mechanical loading.

Tests that we have conducted have established that suitable electrical grade silicone rubber material, for example SILOPREN™ LSR available from Bayer, satisfactorily effects passivation of the varistor block surfaces. EPDM, disclosed in U.S. Pat. No. 4,825,188, is not a suitable material for this purpose.

The above and further features of the present invention are set forth in the appended claims and will be made clear from consideration of the following detailed description given with reference to the accompanying drawings.

DESCRIPTION OF THE DRAWINGS

FIG. 2b is a sectional elevational view of the surge arrester shown in FIG. 2a;

FIG. 3a shows an arrester core sub-assembly constructed as an intermediate phase in the manufacture of a surge arrester as shown in FIGS. 2a and 2b, and one half of a liquid silicone rubber injection moulding system;

FIG. 3b shows the core sub-assembly received within the mould in preparation for the application of an upper mould part and injection of liquid silicone rubber material;

DETAILED DESCRIPTION OF THE EMBODIMENTS

Figure 1A:
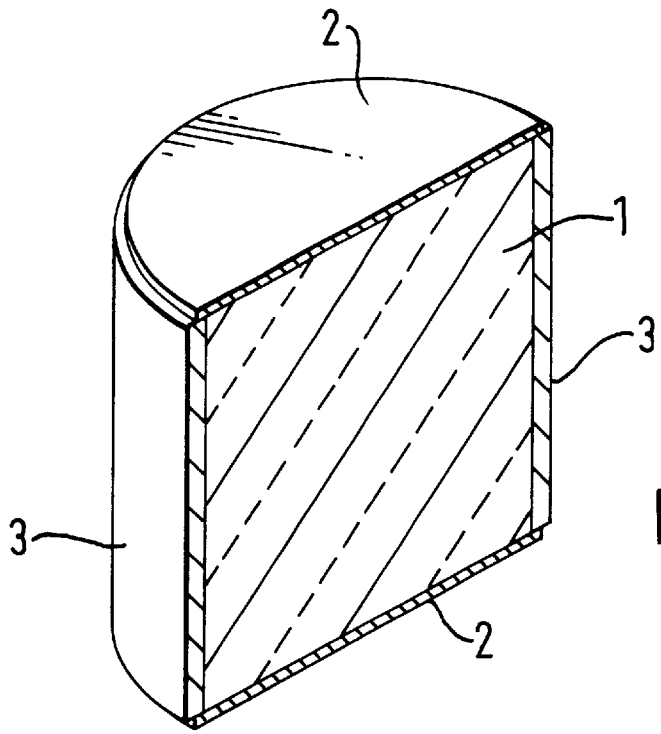
FIG. 1a is a perspective view of a conventional metal oxide varistor block shown cut in half to reveal its construction.
Figure 1B:
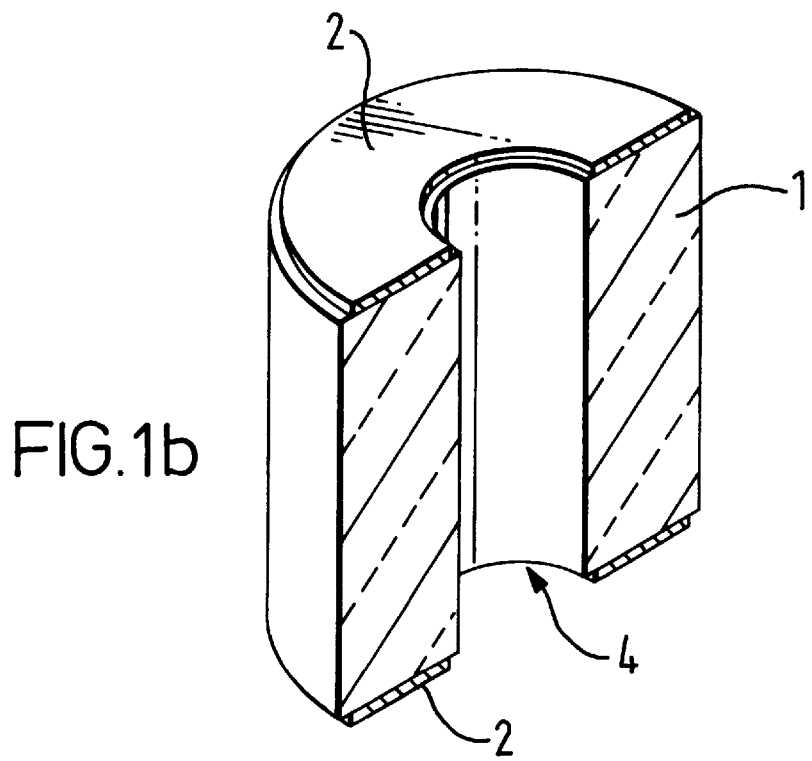
FIG. 1b is a similar perspective view of an exemplary metal oxide varistor block employed in the practice of the present invention.

Referring first to FIGS. 1a and 1b, the former of these figures illustrates the construction of a conventional metal oxide varistor as utilized for example in the polymer housed surge arrester of GB-A-2188199 or in prior and contemporaneous porcelain housed surge arresters, and the latter figure illustrates the construction of a metal oxide varistor for use in the practice of the present invention. As shown, the conventional varistor has a solid circular cylindrical ceramic body 1 formed of Zinc Oxide for example, metallised contacts 2 provided at the axial end surfaces of the ceramic body 1 and a passivation coating 3 provided on the cylindrical surface of the body 1. As mentioned previously, without the passivation coating 3, the varistor could not be used to its full electrical capability without causing a flashover externally of the varistor body 1 between the edges of the metallised contact surfaces 2. Without the benefit of the passivation coating, the electrical strength of the varistor is weakest at its external surface. The varistor of FIG. 1b has no passivation coating and is formed with a central axial through hole 4.

Figure 2A:
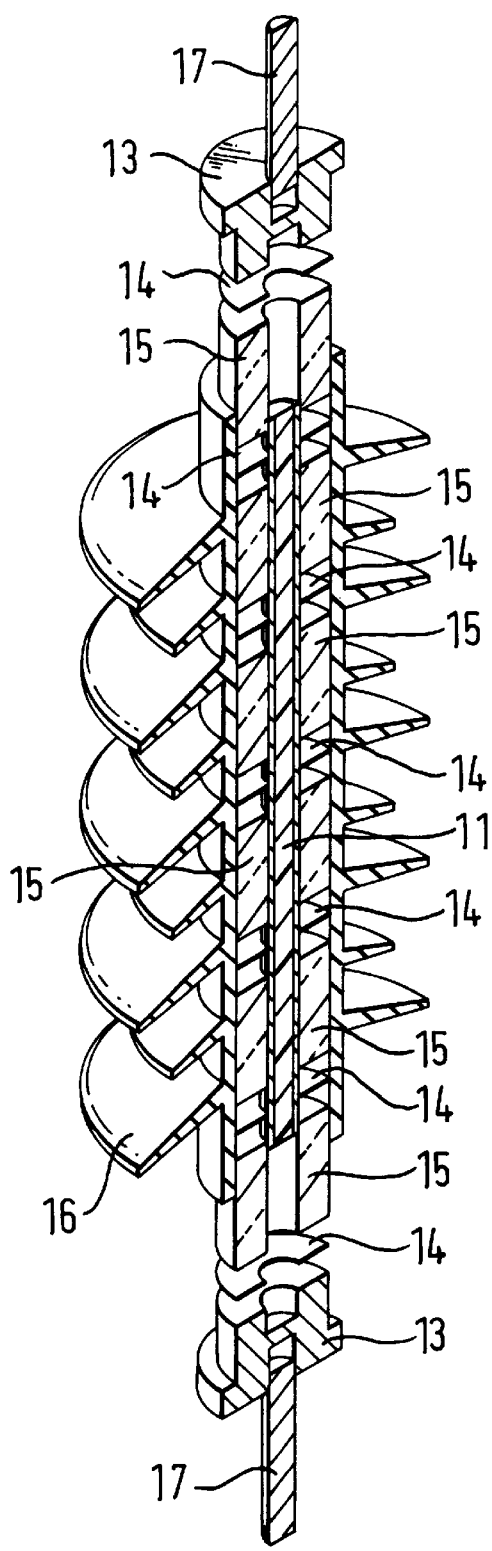
FIG. 2a is a perspective view of an exemplary surge arrester constructed according to the teachings of the present invention, the arrester being shown longitudinally cut in half to reveal its internal construction and with its internal components axially spaced apart.
Figure 2B:
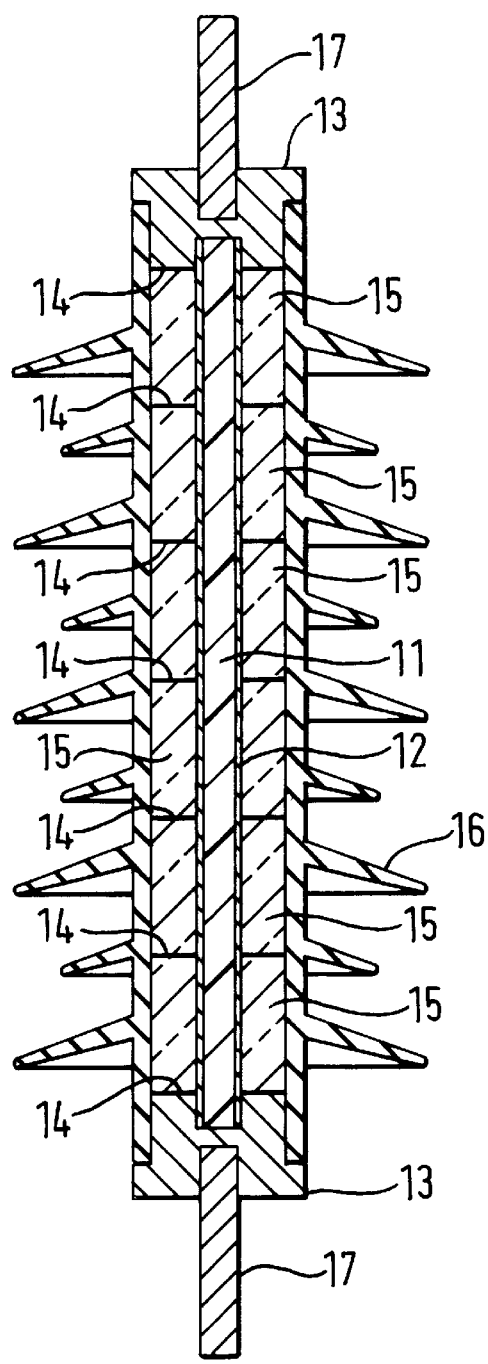

FIGS. 2a and 2b show an exemplary surge arrester constructed in accordance with the teachings of the present invention. A plurality of metal oxide varistor elements 15, each as shown in FIG. 1b, are retained in stacked end to end configuration between end terminations 13 by means of an electrically insulating compression rod 11, formed of glass reinforced plastics material for example, which extends through the through holes 4 of the varistor elements 15 and engages screw-threadedly with the end terminations 13. Soft metal contact discs 14, formed of copper for example, may be provided between the varistor blocks 4 and between the end varistor blocks and the end terminations 13 for distributing the compressive load that is developed as the end terminations 13 are tightened onto the ends of the compression rod 11 and for ensuring a close seal between contiguous electrical contact surfaces.

The axial through holes 4 in the varistor elements 15 are larger than the cross-sectional dimensions of the rod 11 so that a clearance spacing exists within and throughout the length of the varistor block stack between the varistor blocks and the rod. As will be described more particularly hereinafter and as shown in FIG. 2b, this clearance spacing is filled with silicone rubber fluid 12 when the sub-assembly of the varistor blocks 15, the contact disks 14, the rod 11 and the end terminations 13 are placed in a mould into which silicone rubber material in fluid state is injected, the mould including cavities for receiving the sub-assembly such that not only is mould fluid injected into the centre of the surge arrester, but also it is injected around the outside of the sub-assembly so that, when it cures, it forms a shedded integral external housing 16 for the arrester. Externally screw threaded terminal studs 17 are screw threadedly engaged with the end terminations 13 of the arrester for enabling the arrester to be coupled to associated equipment.

As shown in FIG. 2b, the silicone rubber material coats the internal surfaces of the through holes in the varistor blocks and also coats their external cylindrical surfaces. Tests that we have conducted have shown that unpassivated metal oxide varistors when completely surrounded with a suitable grade of silicone rubber, for example Bayer's SILO-PHREN™ LSR, behave in the same or a substantially similar manner as conventionally manufactured varistors provided with surface passivation.

The surge arrester of FIG. 2b has a gapless, solid state configuration with no voids or internal gaseous entrapments. It has high strength, similar to the surge arrester of GB-A-2 188 199, thanks to the reinforced plastics compression rod 11. From an electrical standpoint, it promises to meet all of the standards requirements. Moreover, as described in the following, it can be manufactured more economically than can the surge arrester of GB-A-2 188 199.

FIGS. 3a and 3b illustrate the silicone rubber moulding operation, which relies upon standard silicone rubber moulding techniques. FIG. 3a shows the sub-assembly 21 constituted by the varistor blocks 15 and contact disks 14 assembled between the end terminations 13 and retained by the compression rod 11, and also shows the lower half 23 of an injection mould tool adapted to receive the sub-assembly 21, the upper half of the tool being a mirror image of the lower half. The mould tool 23 has a cavity 30 shaped to receive the sub-assembly 21 as shown in FIG. 3b, with the shoulders 13' of the end terminations 13 fitting sealingly into the axial ends of the cavity. Injection points 24 are provided at one end of the tool for enabling silicone rubber material to be injected into the mould cavity and riser points 25 are provided at the other end of the tool. To enable silicone rubber injected into the mould cavity to access the interior of the sub-assembly 21, the end terminations 13 are provided with injection runners 22 (not shown in the preceding figures) in the form of radial channels across the inner axial faces of the end terminations 13. The tool cavity 30 further has portions 31 to produce the external sheds 16 of the finished surge arrester.

With the sub-assembly 21 received within the mould tool and the two halves of the tool closed about the sub-assembly, liquid silicone rubber material may be injected under pressure into the injection points 24 until it flows from the riser points 25. To aid the injection process and improve the tool filling process, suction may be applied to the riser points 25. Once filled, the silicone rubber flow to the mould is cut off and the silicone rubber within the mould is permitted to cure into its solid state. The mould may be heated to a predetermined temperature to facilitate the curing of the silicone rubber material. When the silicone rubber has solidified, the mould may be opened and the finished surge arrester, as shown in FIG. 2b, removed.

A surge arrester constructed and manufactured as hereinbefore described promises to provide numerous advantages, as follows:

(i) the simple construction of the arrester enables fully automated assembly techniques to be used;

(ii) the metal oxide varistors are less expensive since no passivation coating is required to be provided by their manufacturer;

(iii) the arrester can achieve a high mechanical strength, this being a function of the mechanical strength of the compression rod holding the stacked varistor blocks between the end terminations;

(iv) only a single electrically insulating material, silicone rubber, is employed;

(v) the arrester requires a reduced number of components for its assembly, thereby reducing material and component stocks required;

(vi) no oven curing processes are required;

(vii) lower labour costs result from reduced operator handling;

(viii) the arrester exhibits reduced risk of fire under failure, since silicone rubber will not support combustion and the combustible compression rod is contained not only within the silicone rubber but also within the non-combustible metal oxide varistors;

(ix) for use as a tension insulation arrester (TISA) the axial compression can be increased to offset overhead line tension loads; and (x) assembly techniques are easily adjustable to accommodate mechanical tolerances.

Having described the invention in the foregoing by reference to a specific embodiment, it is to be appreciated that modifications and variations thereto are possible without departure from the spirit and scope of the invention. For example, as in the arrester described in GB-A-2188199 metal spacer blocks may be distributed amongst the varistor blocks. Additionally, more than one compression rod could be provided, particularly perhaps in arresters of larger size having larger diameter varistor blocks. Furthermore, whilst silicone rubber is the presently preferred material for use in the manufacture of the described arrester, other materials not presently known to the present inventors could also prove to be suitable.

Figure 4:
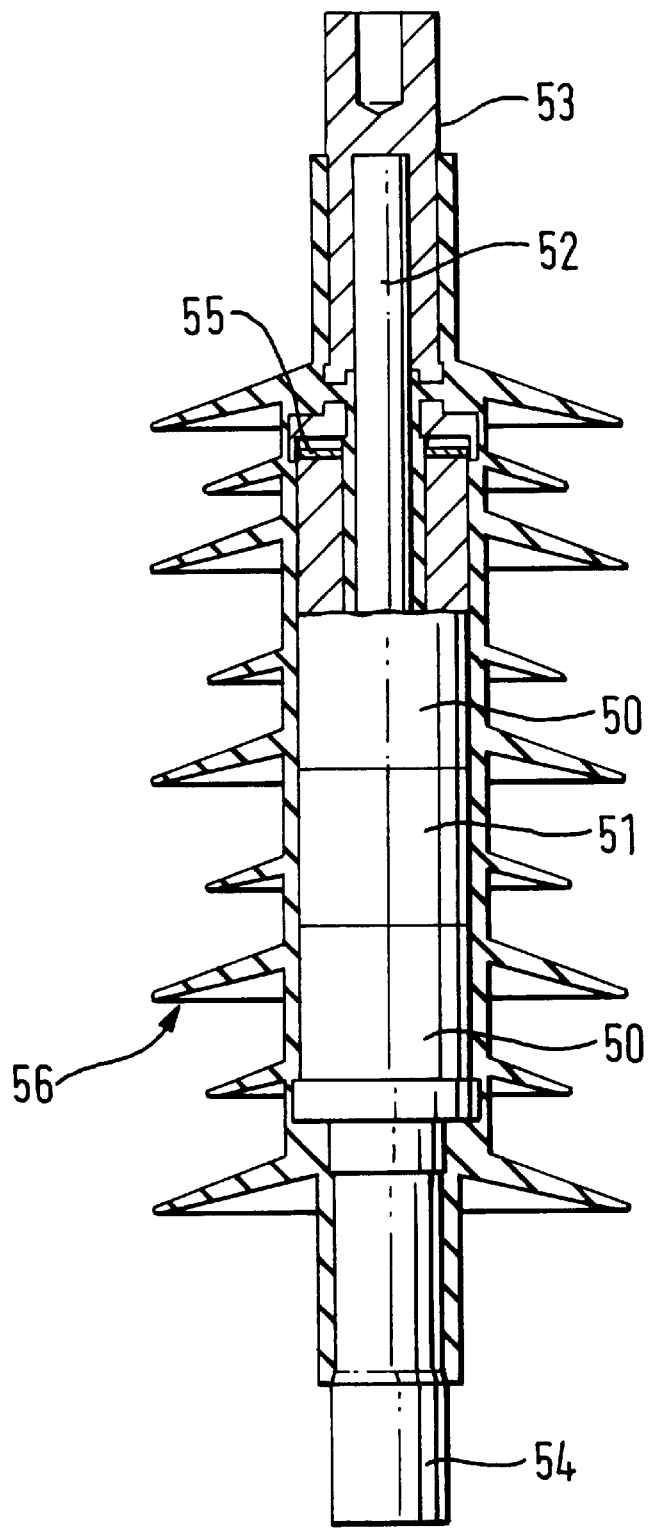
FIG. 4 is a cut-away view of another surge arrester embodying the present invention.
Figure 5:
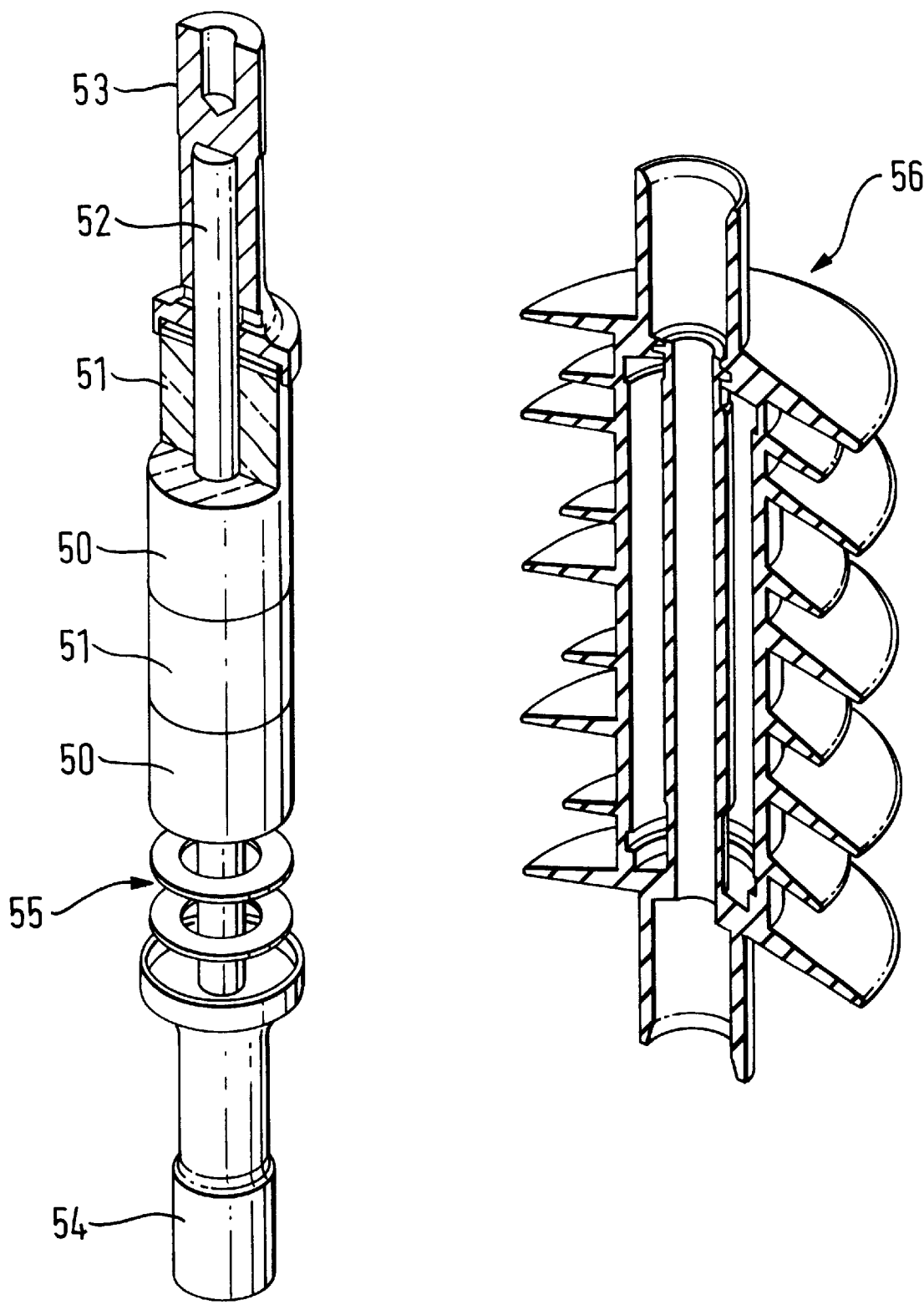
FIG. 5 is an exploded view of the surge arrester of FIG. 4.

FIGS. 4 and 5 show an embodiment of the present invention wherein spacer blocks, which serve also as heat sinks, are distributed with the varistor elements and a precompression assembly is incorporated into the arrester. As shown, metal oxide varistor elements 50 and heat sink/spacer blocks 51 formed of aluminium for example are threaded onto a glass rod pultrusion (pull extrusion) 52. Steel end terminations 53 and 54 formed to be compressed onto the glass rod 52 are provided as shown and a precompression assembly 55 comprising Belleville washers is incorporated into the construction. In assembly, with the components loosely assembled onto the glass rod pultrusion 53, the assembly is put under compression so as to compress the Belleville washers 55 and the end terminations are crimped onto the glass rod 52. Thereafter the assembly is inserted into a mould tool and silicone rubber is injected as previously described herein so as to fill the space between the glass rod 52 and the internal surfaces of the varistor and heat sink/spacer components and form an external shedded housing 56 on the arrester.

The central glass rod pultrusion 52 carries all the mechanical loading that the surge arrester experiences in use, and the glass rod is preloaded in tension by virtue of the provision of the precompression assembly 55 to exceed the maximum load expected during line erection. It is possible that the precompression assembly 55 might be omitted if the glass rod pultrusion 52 were preloaded within its elastic limit and thereby maintained compression of the varistor assembly. The preload would have to be sufficient to exceed any transmission line static loads by an amount equal to the normally required maximum axial pressure on the varistors.

What is claimed is:

1. An electrical surge arrester comprising a stack of varistor elements retained between end terminations by means of an electrically insulating rod passing through through-holes in the varistor elements and secured to said end terminations, the through-holes being larger than a cross-section of said rod and a molded plastic material filling a void that otherwise would exist between the rod and the varistor elements and extending around the external surfaces of the stacked varistor blocks, the varistor elements being devoid of passivation coatings on their internal and external surfaces, and said molded plastic material being selected to provide a passivation function.

2. The electrical surge arrester as claimed in claim 1, wherein said molded plastic material is a silicone rubber material.

3. The electrical surge arrester as claimed in claim 1, wherein the varistor elements are metal oxide ceramic elements.

4. The electrical surge arrester as claimed in claim 3, wherein the varistor elements comprise zinc oxide.

5. The electrical surge arrester as claimed in claim 1, wherein the electrically insulating rod is under pre-load tension in the arrester, by virtue of pre-load means incorporated in the arrester construction.

6. The electrical surge arrester as claimed in claim 1, further comprising a shedded external housing.

7. The electrical surge arrester as claimed in claim 6, wherein the shedded external housing of the arrester is formed integrally with the molded plastic material extending around the external surfaces of the stacked varistor blocks.

8. The electrical surge arrester as claimed in claim 1, wherein said rod comprises a reinforced plastic material or a glass pultrusion.

9. The electrical surge arrester as claimed in claim 1, wherein the rod is screw-threadedly engaged with at least one of the end terminations, or is engaged therewith by virtue of the end termination being compressed onto the rod.

10. The electrical surge arrester as claimed in claim 1, including metal spacer elements distributed among the varistor elements.

11. A method of manufacturing an electrical surge arrester, said method comprising the steps of
    (a) securing a plurality of varistor elements between end terminations by passing an electrically insulating rod through aligned through-holes in the varistor blocks and securing the rod to the end terminations, the through-holes in the varistor elements being larger than a cross-section of said rod, and
    (b) injecting the plastic molding material into the space between the rod and the facing surfaces of the through-holes in the varistor elements and around the external surfaces of the varistor elements,
    (c) the varistor elements being formed devoid of passivation coatings on their internal and external surfaces, and the molded plastic material being selected to provide a passivation function.

12. The method as claimed in claim 11, wherein the plastic material comprises a silicone rubber material.

13. The method as claimed in claim 11, wherein the injection of the plastic molding material around the external surfaces of the varistor elements is effected in such a manner that a shedded outer housing of the arrester is integrally formed.

14. The method as claimed in claim 11, wherein the varistor elements, the rod and the end terminations are first assembled into a sub-assembly, the sub-assembly thus formed is loaded into the cavity of a mold tool, and the plastic molding material is injected into the mold tool in fluid form.

15. The method as claimed in claim 11, wherein the rod is so secured to the end terminations that the rod is under tension.

* * * * *